United States Patent [19]

Benitez et al.

[11] 4,419,503

[45] Dec. 6, 1983

[54] CATALYTIC PROCESS FOR THE PRODUCTION OF PETROLEUM RESINS

[75] Inventors: Francisco M. Benitez; Michael F. English, both of Baton Rouge, La.

[73] Assignee: Exxon Research & Engineering Co., Florham Park, N.J.

[21] Appl. No.: 381,205

[22] Filed: May 24, 1982

[51] Int. Cl.$^3$ .............................................. C08F 4/14
[52] U.S. Cl. ...................................... 526/237; 526/77; 526/290
[58] Field of Search .................................. 526/237, 77

[56] References Cited

U.S. PATENT DOCUMENTS

| | | | |
|---|---|---|---|
| 3,639,366 | 2/1972 | Broca et al. | 260/82 |
| 3,763,125 | 10/1973 | Moody et al. | 260/81 |
| 3,817,953 | 6/1974 | Younger | 260/33.6 |
| 3,865,797 | 2/1975 | Joy | 260/82 |
| 4,076,926 | 2/1978 | Milmer et al. | 526/209 |

FOREIGN PATENT DOCUMENTS 1408870  10/1975  United Kingdom .

Primary Examiner—Stanford M. Levin
Attorney, Agent, or Firm—Roland A. Dexter

[57] ABSTRACT

In a process in which a $C_5$–$C_{12}$ feedstock has been distilled from a cracked petroleum fraction and polymerized with the help of a Friedel-Crafts catalyst to produce a petroleum resin, the $C_5$–$C_{12}$ feedstock is first dried to a moisture content of less than about 10 ppm water and then contacted with anhydrous hydrogen halide, usually HCl, prior to polymerization.

7 Claims, No Drawings

CATALYTIC PROCESS FOR THE PRODUCTION OF PETROLEUM RESINS

The present invention relates to the catalytic polymerization of a petroleum distillate hydrocarbon fraction. More particularly, the present invention relates to a process for the Friedel-Crafts polymerization of mono- and diolefinic hydrocarbons having from 5 to 12 carbons obtained from fractions of petroleum distillates.

BACKGROUND OF THE INVENTION

The processing of crude petroleum gives rise to various hydrocarbon fractions which may subsequently be "cracked" by heating, usually in the presence of steam, to produce a range of lower boiling products among which ethylene and propylene feature prominently. Naphtha (boiling range 32° to 205° C.) and gas oil (boiling range 205° to 430° C.) are suitable cracking feedstocks. As well as ethylene and propylene the cracked product also contains hydro-carbons of increasing molecular weight and boiling point from butenes through pentenes, hexanes, naphthenes, aromatics to cyclic and acyclic hydrocarbons of even higher carbon number. It is customary to fractionate these hydrocarbons by distillation into groups of compounds with similar boiling points. Thus, the $C_4$ hydrocarbons removed as one fraction are followed by a range of compounds which may be designated for convenience as a $C_5$ stream (although containing residual $C_4$ hydrocarbon stream) predominating in $C_5$–$C_6$ hydrocarbons containing 200 to 500 ppm $H_2O$, with or without further refining and with or without further additive reactants, which forms a suitable feedstock for the production of petroleum resins.

The resins, which vary in their properties as the hydrocarbon feedstock used in their preparation varies, are generally produced by treating the feedstock with a Friedel-Crafts polymerization catalyst, preferably a metallic halide, particularly aluminum chloride. The unsaturated hydrocarbons in the feedstock undergo homo- and co-polymerization reactions which give rise to a resinous product having softening points in the range of 85° C. to 120° C.

The Friedel-Crafts catalyst is generally taught to be used as a liquid ternary complex with a halogen hydroacid and: an aromatic compound (see U.S. Pat. No. 3,639,366 with equimolar amounts of aluminum chloride, hydrochloric acid and several alkylated benzenes); or a benzene which is liquid at the reaction temperature and which is substituted by at least one secondary or ternary alkyl or cycloalkyl group (see U.S. Pat. No. 3,763,125 where anhydrous $AlCl_3$ and HCl are used to prepare the liquid ternary catalyst in cumene or p-cumene and see also U.S. Pat. No. 3,817,953, U.S. Pat. No. 3,865,797, and U.K. No. 1,408,870 which also teach complexing with toluene and xylene); or an alkylated benzene in combination with an alcohol or ether (see U.S. Pat. No. 4,076,926). In certain conditions when it is inappropriate to use the efficient ternary complex, much larger amounts of catalyst are required.

The polymerization reaction results in a polymerizate which is soluble in the hydrocarbon diluent present in the reactor and carried out from the reactor along with the catalyst which is subsequently water quenched and separated as an aluminous water waste product.

It is therefore highly desirable to increase the catalyst efficiency whereby greater resin yield is possible with less waste product which product is both an economic and environment debit.

It is an object of this invention to improve the catalytic efficiency of a Lewis acid, in particular $AlCl_3$, catalyst in the production of petroleum resins.

STATEMENT OF THE INVENTION

It has been discovered that petroleum resins may be produced in markedly improved yield efficiency by utilizing a dried (water content of less than about 10 ppm) predominantly $C_5$–$C_6$ olefinic hydrocarbon distillate fraction having a boiling range of from 40° C. to 150° C. admixed with anhydrous hydrogen chloride in amounts sufficient to provide molar ratio of from 0.5 to 2.0 based on the moles of aluminum chloride catalyst as the feedstream for the production of said resins.

In accordance with this invention there is provided a process for the polymerization of olefin and diolefin hydrocarbons into a petroleum resin comprising the step of contacting a feedstream of olefinic and diolefinic hydrocarbons of 5 to 12 carbon atoms having less than about 100, preferably less than 50, optimally less than 10, ppm water with an anhydrous hydrogen halide in a weight ratio of hydrogen halide to feedstream of 1:250 to 1:2000 and under substantially anhydrous conditions with a catalyst comprising a Friedel-Crafts metal halide selected from the group consisting of all $AlCl_3$, $AlBr_3$ and $BF_3$ said hydrogen halide present in a molar ratio with said metal halide of from 0.5 to 2 and thereby causing the $C_5$–$C_{10}$ olefinic and diolefinic hydrocarbons to form a petroleum resin.

In its preferred embodiment the process of the invention provides for production of resins by means of contacting feedstream of olefinic and diolefinic hydrocarbons predominantly of 5 to 6 carbon atoms and of a water content less than about 10 ppm with an anhydrous hydrogen chloride in a weight ratio of hydrogen chloride to feedstream of 1:250 to 1:2000, at a temperature of −20° to +100° C., a pressure of atmospheric to 200 p.s.i.g., and under substantially anhydrous conditions with an aluminum chloride catalyst present in a molar ratio with said $AlCl_3$ of from 0.5 to 2, and thereby causing said olefinic and diolefinic hydrocarbons to form petroleum resins having a molecular weight average of 1000 to 3000.

There is also taught herein a continuous process for preparing petroleum resins from a feedstream mixture of predominantly $C_5$–$C_6$ olefinic hydrocarbons containing less than about 100, preferably 50, optimally 10, ppm water in a continuous stirred reactor at a reaction temperature of about −20° C. to 100° C., said reactor having a feedstream inlet and an $AlCl_3$ catalyst inlet, which comprises injecting anhydrous hydrogen chloride into said feedstream at a point prior to its entry into the reactor in a molar amount based on the moles of $AlCl_3$ ranging from 0.5 to 2 and simultaneously the $AlCl_3$ catalyst, the catalyst having a concentration of about 0.75 wt. % $AlCl_3$ in and continuously contacting said feedstream with said catalyst to form said petroleum resin in the reaction mixture, withdrawing the reaction mixture from the reactor, quenching the reaction mixture with aqueous alkali and separating therefrom the petroleum resin products.

DETAILED DESCRIPTION OF THE INVENTION

The process of the invention is applicable to any known Friedel-Crafts catalyzed polymerization in which a carrier is required for the catalyst and is particularly applicable to the production of resins from raw materials comprising $C_5$ to $C_{12}$ mono- and diolefins, conjugated diolefins styrene, alpha-methylstyrene, vinyl toluenes, indene and methyl indenes, cycloaliphatics and mixtures thereof. Mixtures of conjugated and other olefins contained in a "$C_5$-$C_6$ stream" derived from a steam cracked naphtha by distillation and boiling, for example, in the range of $-10°$ to $80°$ C., particularly $+10°$ to $80°$ C. may be used. Such a stream may contain cyclopentadiene, isoprene, piperylene and mono-olefins such as cyclopentene, pentene-1 and methyl butenes. Polymerization of such a $C_5$-$C_6$ steam by a Friedel-Crafts catalyst yields a polymer useful as a "petroleum resin."

Friedel-Crafts polymerization catalysts are Lewis acids and for purposes of this invention generally preferred are the halides of aluminum, iron, boron antimony and titanium. An especially preferred Friedel-Crafts catalyst for use in the process of the invention is aluminum chloride. Hydrogen halides include hydrogen chloride, hydrogen bromide and hydrogen fluoride.

Typically, the feedstream used for the polymerization contains from 200 to 500 ppm of water. It has been found that reducing the water content to less than 100, preferably less than about 50, optimally less than 10, ppm of the feedstream followed by the addition of anhydrous hydrogen chloride in molar amounts based on the moles of aluminum chloride of from 0.5 to 2.0 to said stream requires much less aluminum chloride to provide normal yields of a resin having all the desired properties of softening point, lightness of color and compatibility with poly(ethylene vinyl acetate) and waxes. The pre-drying and hydrogen halide injection of the feedstock makes possible catalytic polymerization of the feedstock and recovery of the resin product with a marked reduction of aluminous waste byproduct resulting from the inactivation and separation of the catalyst from the resin product.

The $C_5$-$C_6$ feedstream typically has the following weight composition range:

Diolefins 10-20%
Olefins 20-60%
Aromatics 40-10%
Alkanes 30-10%

The feedstream is maintained at a sufficient pressure to be in a liquid form both in the reactor inlet and in the reaction mixture itself at the reaction temperature of about $-20°$ to $100°$ C., conventional cooling means being used to maintain the reactor at these temperatures in view of the exothermic nature of the reaction.

The present invention uses a continuous type stirred reactor having two inlet means for simultaneous introduction of the dried and hydrogen chloride injected feedstream and aluminum chloride catalyst, the latter being added in the form of a powder.

The drying of the feedstream can be accomplished by pre-contacting with a mixture of NaCl and $CaCl_2$ to reduce the water content of from 200 to 500 ppm to approximately 50 to 25 ppm. A further water reduction can be achieved by passing such a pre-dried feed through a bed of 3 A or 4 A molecular sieves, or by distillation. The introduction of hydrogen chloride can be accomplished by metering the required amount of HCl in the dried feedstream prior to entry into the reactor or into the reactor directly as a separate stream.

The rest of the process from synthesis to polymer purification is standard and does not have to be changed due to the treatment described above. Thus, the dried feedstream containing anhydrous HCl is simultaneously and continuously added to the reactor with $AlCl_3$ catalyst polymerization occurs in an exothermic reaction by contacting the one or two incoming streams with the catalyst in a cooled reactor with reactor temperature maintained preferably at about $25°$-$60°$ C.

The reaction of the invention can be carried out at a temperature in the range of $-20°$ C. to $+100°$ C., preferably $+25°$ to $+60°$ C. under atmospheric pressure. The catalyst concentration is preferably in the range of 0.3 to 1 wt. percent (based on the feedstream) and the reaction, i.e. residence, time preferably of 1 to 5 hours. The reactor effluent which contains the polymerization, catalyst and diluent is washed with aqueous caustic after which polymer recovery and finishing is carried out in the conventional manner.

The invention will now be further described with reference to the following examples:

EXAMPLES 1-9

The following procedure was used for all the Examples: 300 grams of feed having a composition:

| Component | Wt. % |
|---|---|
| Pentenes | 21.7 |
| 2-methyl Butene | 2.7 |
| Pentadiene-1,3 | 18.0 |
| Cyclopentadiene-1,3 | 2.0 |
| Cyclopentene | 11.0 |
| Hexenes | 12.0 |
| Diluents | 32.6 | and containing the usual level of water (200 to 300 ppm) were added to a round bottom flask equipped with a condenser and a dry nitrogen inlet. To this feed a small amount of drying agent such as $LiAlH_4$ or BaO was added and allowed to react with the feed for 0.5 to 1.0 hours at temperatures between $25°$ C. and $45°$ C. At the end of this reaction time the feed was separated from the inorganic salts by a simple flash distillation. Before contacting this dried feed with the aluminum trichloride, the required amount of anhydrous HCl was bubbled through the feed slowly to maximize absorption. Upon completion of the HCl addition to the feed, it was contacted with the desired amount of $AlCl_3$ for 1 hour at $40°$ C. The separation of the catalyst from the polymerizate and the purification and polymer finishing was carried out by lowering the reactor content temperature to $20°$ C. and adding 400 ml of a 3:1 mixture of water to isopropanol. After all the $ALCl_3$ has been hydrolyzed the dilute polymer solution was washed with 2 liter of a 3:1 mixture of water isopropanol twice. The clean polymerizate was heated to $195°$ C. under nitrogen to volatilize the unreacted olefines and alkanes leaving behind a mixture of oligomers and the hydrocarbon resin. This mixture is further stripped by steam to separate the oligomers from the resin. This separation is carried out at $250°$ C. until 150 ml of steam condensate are collected in the receiving flask leaving behind the purified resin.

The following Table summarizes the results of the experiments of the Examples:

| Example No. | 1 | 2 | 3 | 4 | 5 | 6 | 7 | 8 | 9 |
| --- | --- | --- | --- | --- | --- | --- | --- | --- | --- |
| ppm $H_2O$ in Feed | 250 | 250 | 10 | 10 | 10 | 10 | 250 | 10 | 10 |
| Moles of $AlCl_3$ Catalyst | .023 | .023 | .023 | .020 | .011 | .008 | .011 | .008 | .011 |
| Moles of Anhydrous HCl | 0.0 | 0.0 | 0.0 | .008 | .004 | .022 | 0.0 | .006 | .008 |
| % Yield of Resin | 30.6 | 31.6 | 27.0 | 30.7 | 27.0 | 28.0 | 19.6 | 24 | 29 |
| Catalyst Efficiency[1] | 30.6 | 31.6 | 27.3 | 34.1 | 54.0 | 83.0 | 39.3 | 72 | 58 |
| Softening Point of Resin °C. ASTM E28 | 100.5 | 99.5 | 102 | 102.5 | 106 | 104 | 99.5 | 103 | 103 |
| Cloud Point of Resin °C.[2] | 86 | 120 | 78 | 100 | 120 | 106 | 95 | 120 | 115 |
| Gardner Color of Resin[3] | 5½ | 5½ | 3+ | 4 | 4 | 3 | 3+ | 3 | 3+ |

[1] Grams of resin/grams of $AlCl_3$
[2] Cloud point determined by admixing resin with 1 part by weight of Elvax ® 250 and 2 parts by weight of paraffin wax
[3] Measured on solution of 50 wt % resin in toluene From the above it is apparent that at reduced levels of $AlCl_3$ the absence of water in the feed and the addition of HCl has more pronounced effects on the yield of the reaction and the catalyst efficiency without noticeable change in the resin properties of softening point, compatibility with adhesive polymeric components such as ethylene vinylacetate copolymer, cloud point and color. Retention of the softening point is particularly important for the use of the resin as a tackifier for elastomers used to provide adhesives for tapes and labels. Since compatibility is indicated by cloud point, the lack of change in this property in the resins produced by the process of the invention is indicative of its exceptional utility. It also shows that the optimum ratios of $AlCl_3$ to HCl needed to maintain the efficiency as high as possible and the yield constant varies from:

| | Maximum | Optimum | Minimum |
| --- | --- | --- | --- |
| Moles $AlCl_3$ | .008 | .015 | .017 |
| Moles HCl | .004 | .022 | .033 |
| $AlCl_3$/HCl | 2 | 0.7 | 0.5 |

This ratio can be varied according to the percent reactive molecules present in the feed and according to the polymer properties required. But, as a guide, when less than 0.022 moles of $AlCl_3$ are used the addition of HCl should not exceed 0.044 moles.

The invention in its broader aspect is not limited to the specific details shown and described and departures may be made from such details without departing from the principles of the invention and without sacrificing its chief advantages.

What is claimed is:

1. A process for the polymerization of olefin and diolefin hydrocarbons into a petroleum resin comprising the step of contacting a feedstream of olefinic and diolefinic hydrocarbons of 5 to 12 carbon atoms having less than about 100 ppm water with an anhydrous hydrogen halide in a weight ratio of hydrogen halide to feedstream of 1:250 to 1:2000 and under substantially anhydrous conditions with a catalyst comprising a Friedel-Crafts metal halide selected from the group consisting of $AlCl_3$, $AlBr_3$ and $BF_3$, said hydrogen halide present in a molar ratio with said metal halide of from 0.5 to 2 and thereby causing the $C_5$–$C_{10}$ olefinic and diolefinic hydrocarbons to form a petroleum resin.

2. The process of claim 1 wherein said feedstream is predominantly of hydrocarbons having from 5 to 6 carbons and of water content of less than about 10 ppm.

3. The process of claim 2 wherein the reaction is carried out in hydrocarbon diluent.

4. The process of claim 2 wherein the molar ratio of metal halide to hydrogen halide is 1 to 1.6.

5. The process of claim 2 wherein said feedstream of olefinic and diolefinic hydrocarbons comprises a minor amount of unsaturated cycloaliphatic hydrocarbons of $C_{10}$–$C_{12}$ carbons.

6. The process of claim 2 wherein the Friedel-Crafts metal halide is aluminum trichloride and the hydrogen halide is hydrogen chloride.

7. The process of claim 6 wherein the moisture content of said feedstream is less than 5 ppm and said feedstream comprises from 10 to 20 wt.% diolefins, 20 to 60 wt.% monoolefins, 10 to 40 wt.% aromatics and from 10 to 30 wt.% alkanes.

* * * * *